(12) United States Patent
Huang et al.

(10) Patent No.: US 11,968,298 B2
(45) Date of Patent: *Apr. 23, 2024

(54) SYSTEMS AND METHODS FOR QUANTUM-SECURED, PRIVATE-PRESERVING COMPUTATIONS

(71) Applicant: THE TRUSTEES OF THE STEVENS INSTITUTE OF TECHNOLOGY, Hoboken, NJ (US)

(72) Inventors: Yuping Huang, Norwood, NJ (US); Lac Thi Thanh Nguyen, Jersey City, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,530

(22) Filed: Jun. 6, 2023

(65) Prior Publication Data
US 2023/0396423 A1    Dec. 7, 2023

Related U.S. Application Data

(63) Continuation of application No. 17/769,303, filed as application No. PCT/US2020/056160 on Oct. 16, 2020, now Pat. No. 11,711,209.
(Continued)

(51) Int. Cl.
*H04L 9/08* (2006.01)

(52) U.S. Cl.
CPC ........ *H04L 9/0852* (2013.01); *H04L 2209/46* (2013.01)

(58) Field of Classification Search
CPC . H04L 9/0852; H04L 2209/46; H04L 9/3218; H04L 9/085; H04L 9/0861
See application file for complete search history.

(56) References Cited

U.S. PATENT DOCUMENTS

| | | | |
|---|---|---|---|
| 5,850,285 | A | 12/1998 | Hill et al. |
| 6,480,265 | B2 | 11/2002 | Maimon et al. |
| (Continued) | | | |

FOREIGN PATENT DOCUMENTS

| | | |
|---|---|---|
| CN | 202048988 U | 11/2011 |
| CN | 111897054 A | 11/2020 |
| (Continued) | | |

OTHER PUBLICATIONS

PCT International Preliminary Report on Patentability for PCT/US2020/056160, mailed on Feb. 1, 2021, 9 pages.
(Continued)

*Primary Examiner* — Baotran N To
(74) *Attorney, Agent, or Firm* — Clark Hill PLC; Ralph W. Selitto; John K. Kim

(57) ABSTRACT

The present invention relates to methods for secure computation and/or communication. Entangled photons (118) are generated such that each participating party receives a series of optical pulses. Each party has private information (110, 112) which are never transmitted through public or private communication channels. Instead, each party converts their respective private information (110, 112) into measurement bases via an encryption process (114, 116) which are then applied to the entangled photons (118). After the measurement process, e.g., quantum frequency conversion (122, 124), reference indices are announced (124, 126) so that computation can be performed (128) without revealing the private information directly or indirectly.

25 Claims, 10 Drawing Sheets

Related U.S. Application Data

(60) Provisional application No. 62/923,322, filed on Oct. 18, 2019.

(56) References Cited

U.S. PATENT DOCUMENTS

| | | |
|---|---|---|
| 6,483,592 B2 | 11/2002 | Pedigo |
| 7,567,596 B2 | 7/2009 | Dantus et al. |
| 8,072,609 B1 | 12/2011 | Trivedi et al. |
| 8,309,929 B2 | 11/2012 | Bond et al. |
| 8,339,581 B2 | 12/2012 | Guha et al. |
| 8,621,931 B2 | 1/2014 | Phua et al. |
| 8,665,923 B2 | 3/2014 | Sprangle et al. |
| 8,761,606 B2 | 6/2014 | Habif |
| 9,596,421 B1 | 3/2017 | Itzler |
| 9,696,133 B2 | 7/2017 | Yuan et al. |
| 9,945,948 B2 | 4/2018 | Yang et al. |
| 10,860,746 B2 | 12/2020 | Foster et al. |
| 11,003,046 B2 | 5/2021 | Liscidini |
| 11,264,775 B2 | 3/2022 | Huang |
| 11,442,697 B2 | 9/2022 | Huang et al. |
| 11,711,209 B2 * | 7/2023 | Huang .................. H04L 9/085 |
| | | 713/168 |
| 2002/0097962 A1 | 7/2002 | Yoshimura et al. |
| 2004/0136634 A1 | 7/2004 | Chowdhury et al. |
| 2005/0123242 A1 | 6/2005 | Walker |
| 2006/0083379 A1 * | 4/2006 | Brookner .............. H04L 9/0852 |
| | | 380/286 |
| 2006/0222180 A1 | 10/2006 | Elliott |
| 2006/0245680 A1 | 11/2006 | Rasmussen et al. |
| 2008/0138087 A1 | 4/2008 | Jiang et al. |
| 2009/0046296 A1 | 2/2009 | Kilpatrick et al. |
| 2010/0124787 A1 | 5/2010 | Nitkowski et al. |
| 2013/0036145 A1 | 2/2013 | Pruneri |
| 2014/0098955 A1 * | 4/2014 | Hughes .................. H04K 1/02 |
| | | 380/256 |
| 2014/0192363 A1 | 7/2014 | Kippenberg et al. |
| 2015/0323450 A1 | 11/2015 | Lipson et al. |
| 2016/0234017 A1 * | 8/2016 | Englund .............. H04B 10/25 |
| 2017/0131388 A1 | 5/2017 | Campbell et al. |
| 2018/0241480 A1 | 8/2018 | Hughes |
| 2020/0257502 A1 | 8/2020 | Steinle |
| 2020/0274703 A1 * | 8/2020 | Lukens .................. G06N 10/00 |
| 2020/0285131 A1 | 9/2020 | Marandi et al. |
| 2021/0080805 A1 | 3/2021 | Srinivasan et al. |
| 2021/0156684 A1 | 5/2021 | Huang |
| 2021/0247662 A1 | 8/2021 | Dorche et al. |
| 2022/0075238 A1 | 3/2022 | Huang et al. |
| 2023/0079367 A1 | 3/2023 | Huang et al. |
| 2023/0155823 A1 * | 5/2023 | Huang .................. H04L 9/3218 |
| | | 713/168 |
| 2023/0168563 A1 | 6/2023 | Huang et al. |

FOREIGN PATENT DOCUMENTS

| | | |
|---|---|---|
| EP | 3477362 A1 | 6/2019 |
| EP | 3286603 B1 | 2/2020 |
| GB | 2510916 A | 4/2015 |
| JP | 2003-018144 A | 1/2003 |
| JP | 4091956 B2 | 5/2008 |
| JP | 2015-220621 A | 12/2015 |
| KR | 101899026 B1 | 10/2018 |
| WO | 2006/003715 A1 | 4/2008 |
| WO | 2018031916 A1 | 2/2018 |
| WO | 2019241582 A1 | 6/2020 |
| WO | WO2021226395 A1 | 11/2021 |
| WO | WO2021231794 A1 | 11/2021 |
| WO | WO2023004148 A1 | 1/2023 |

OTHER PUBLICATIONS

Extended European Search Report for European Patent Application 22115115.2, mailed on Mar. 15, 2023, 5 pages.

Goorden, Sebastianus & Horstmann, Marcel & Mosk, Allard & Skoric, Boris & Pinkse, Pepijn. (2013). Quantum-Secure Authentication with a Classical Key.

Arapinis et al. "Quantum Physical Unclonable Functions: Possibilities and Impossibilities." Jun. 15, 2022, Quantum 5, 475 (2021). arXiv:1910.02126v4.

F. Xu, Experimental fast quantum random No. generation using high-dimensional entanglement with entropy monitoring, Optica 3, 1266-1269 (2016).

Hochrainer, Low-Loss Optical Elements for a Loophole-Free Bell Test, 2014 (Thesis).

Lee, H., Chen, T., Li, J. et al. Ultra-low-loss optical delay line on a silicon chip. Nat Commun 3, 867 (2012). https://doi.org/10.1038/ncomms1876.

Fiorentino, Marco & Munro, William & Santori, Charles & Spillane, Sean & Beausoleil, Ray. (2006). All-Fiber-Optic Quantum Random Number Generator. 1-2. 10.1109/CLEO.2006.4628717.

Nguyen L, Rehain P, Sua YM, Huang YP. Programmable quantum random number generator without postprocessing. Opt Lett. Feb. 15, 2018;43(4):631-634. doi: 10.1364/OL.43.000631. PMID: 29444039.

Nguyen, Lac & Rehain, Patrick & Sua, Yong Meng & Huang, Yu-Ping. (2018). Quantum Random Number Generator with Programmable Probability Distributions. JTu3A.30. 10.1364/FIO.2018. JTu3A.30.

Kumar, S., Zhang, H. & Huang, YP. Large-scale Ising emulation with four body interaction and all-to-all connections. Commun Phys 3, 108 (2020). https://doi.org/10.1038/s42005-020-0376-5.

D. Pierangeli, G. Marcucci, and C. Conti, Large-Scale Photonic Ising Machine by Spatial Light Modulation. Phys. Rev. Lett. 122, 213902—Published May 31, 2019.

Roques-Carmes, C., Shen, Y., Zanoci, C. et al. Heuristic recurrent algorithms for photonic Ising machines. Nat Commun 11, 249 (2020). https://doi.org/10.1038/s41467-019-14096-z.

Shahverdi A, Sua YM, Dickson I, Garikapati M, Huang YP. Mode selective up-conversion detection for LIDAR applications. Opt Express. Jun. 11, 2018;26(12):15914-15923. doi: 10.1364/OE.26.015914. PMID: 30114845.

Geiser, P., Willer, U., Walter, D., and Schade, W., "A subnanosecond pulsed laser-source for mid-infrared LIDAR", Applied Physics B: Lasers and Optics, vol. 83, No. 2, pp. 175-179, 2006. doi:10.1007/s00340-006-2158-5.

Shahverdi, Amin & Sua, Yong Meng & Tumeh, Lubna & Huang, Yu-Ping. (2017). Quantum Parametric Mode Sorting: Beating the Time-Frequency Filtering. Scientific Reports. 7. 10.1038/s41598-017-06564-7.

J. Lu, J. Surya, X. Liu, A. Bruch, Z. Gong, Y. Xu, and H. Tang, "Periodically poled thin-film lithium niobate microring resonators with a second-harmonic generation efficiency of 250,000%/W," Optica 6, 1455-1460 (2019).

Fu. Y., Guo, M., & Phua, P. B. (2010). Spatially encoded multibeam laser Doppler vibrometry using a single photodetector, Optics Letters, 35(9), 1356-1358.

Yanlu Li, Jinghao Zhu, Matthieu Duperron, Peter O'Brien, Ralf Schüler, Soren Aasmul, Mirko de Melis, Mathias Kersemans, and Roel Baets, "Six-beam homodyne laser Doppler vibrometry based on silicon photonics technology," Opt. Express 26, 3638-3645 (2018).

Patrick Rehain, Jeevanandha Ramanathan, Yong Meng Sua, Shenyu Zhu, Daniel Tafone, and Yu-Ping Huang, "Single-photon vibrometry," Opt. Lett. 46, 4346-4349 (2021).

Jiuyi Zhang, Yong Meng Sua, Jia-Yang Chen, Jeevanandha Ramanathan, Chao Tang, Zhan Li, Yongxiang Hu, Yu-Ping Huang; Carbon-dioxide absorption spectroscopy with solar photon counting and integrated lithium niobate micro-ring resonator. Appl. Phys. Lett. Apr. 26, 2021; 118 (17): 171103. https://doi.org/10.1063/5.0045869.

Tri Cao Doan, Resonant Matter Wave Amplification in Mean Field Theory, arXiv: 1112.3325v1 Quantum Gases, Dec. 14, 2011.

Hu, Yi & Siviloglou, Georgios & Zhang, Peng & Efremidis, Nikolaos & Christodoulides, Demetrios & Chen, Zhigang. (2012). Self-accelerating Airy Beams: Generation, Control, and Applications. 10.1007/978-1-4614-3538-9_1.

(56) References Cited

OTHER PUBLICATIONS

Yu-Ping Huang and Prem Kumar, "Mode-resolved photon counting via cascaded quantum frequency conversion," Opt. Lett. 38, 468-470 (2013).
Abijith S. Kowligy, Paritosh Manurkar, Neil V. Corzo, Vesselin G. Velev, Michael Silver, Ryan P. Scott, S. J. B. Yoo, Prem Kumar, Gregory S. Kanter, and Yu-Ping Huang, "Quantum optical arbitrary waveform manipulation and measurement in real time," Opt. Express 22, 27942-27957 (2014).
Jingle Liu, Jianming Dai, See Leang Chin, and X.-C. Zhang, "Broadband terahertz wave remote sensing using coherent manipulation of fluorescence from asymmetrically ionized gases," Nature Photonics, vol. 4, (Sep. 2010).
R. Sferopoulos, "A Review of Chemical Warfare Agent (CWA) Detector Technologies and Commercial-Off-The-Shelf Items," DSTO Defence Science and Technology Organisation, Fishermans Bend, Victoria, Australia (2009).
Scully, et al., "Quantum Optics," Published by Cambridge University Press, 1997.
Huang, et al., "Heralding single photons without spectral factorability", Phys. Rev. A 82, 043826 (2010).
Seth Lloyd, "Enhanced Sensitivity of Photodetection via Quantum Illumination", Science321,1463-1465(2008). DOI:10.1126/science.1160627.
U.S. Appl. No. 17/899,493, filed Aug. 30, 2022, titled Approaches, Apparatuses, and Methods for Non-Interferometric Quantum Photonics Vibrometry. Yuping Huang et al.
Office Action for Japanese Patent Application JP2022-523147 entitled "Systems and Methods for Quantum-Secured, Private-Preserving Computations" mailed on Jan. 9, 2024.

\* cited by examiner

SYSTEMS AND METHODS FOR QUANTUM-SECURED, PRIVATE-PRESERVING COMPUTATIONS

CROSS-REFERENCE TO RELATED APPLICATION

This application is a continuation of application Ser. No. 17/769,303 filed Apr. 14, 2022, which was a U.S. PCT National Phase entry under 35 U.S.C. 371 of PCT International Patent Application Serial No. PCT/US2020/056160 filed Oct. 16, 2020, which claims the benefit of and priority to U.S. Provisional Patent Application Ser. No. 62/923,322 filed Oct. 18, 2019, the entire disclosures of each of which are incorporated herein by reference.

FIELD OF THE INVENTION

The present invention relates to secure data sharing and processing among untrusted parties that minimizes the risk of privacy breach and sensitive information compromise. More particularly, the present invention pertains to privacy-preserving computation and quantum implementations thereof, zero knowledge data processing and quantum implementations thereof, and data mining, authentication and verification.

STATEMENT REGARDING FEDERALLY SPONSORED RESEARCH

None.

BACKGROUND OF THE INVENTION

Maintaining the security of data, especially during exchange of information, is an increasingly urgent issue. Current secure multi-party computation methodologies protect individual information by modifying the original data with techniques such as noise adding, information blocking, data encryption, etc. However, these techniques only guarantee the privacy to a certain level, through distortion of information, because in some applications, such as data mining, extracting distorted knowledge may make them inoperable or perform inefficiently. Mitigating these issues, however, often comes at the cost of information security (e.g., by making it susceptible to leaks of personal information data).

Even with such techniques involving data modification, privacy is not provably (i.e., unconditionally) secured against known privacy intrusion methods. In other words, while those methods may prevent or challenge these privacy intrusion methods, they do not guarantee information security, or are only conditionally secure. In many existing cyber technologies, data-at-rest and data-in-transit are encrypted, but data-in-use might not be. To protect data-in-use, homomorphic encryption techniques may be applied. However, this is a complex process that is limited in applicability and capability.

Furthermore, current technology typically requires either a trusted set up (i.e., a method involving a trusted third party serving as an intermediary for the information) or the proof size becomes excessive. For instance, blockchain privacy technology has been one attempt to provide zero-knowledge proof, conducted via Boolean circuits. While it does not require a trusted setup or any interaction between prover and verifier, the proof size is too large to be used in blockchain or limited computing devices. It is also not provably secure.

SUMMARY

Before summarizing the present invention, the following terms are being defined to facilitate the discussion and consideration of the present invention.

Measurement basis is what is used to measure the state of each photon. The type of measurement basis can be chosen as photon arrival times, spectral modes of photons, etc. The present invention is applicable to any choice of measurement bases, so long as quantum entanglement can be established on those bases. The type of measurement basis should be announced publicly to parties in the computation pool. FIG. 3 describes an example of measurement basis choice based on photon arrival time.

Mutually unbiased bases are sets of state bases for a quantum system, each set forming a complete description of the system, with the inner product of any state basis in one set with any basis in another having about the same amplitude.

Pulse index represents the time slot number of a detected photon. All parties in the communication pool are synchronized to a common reference signal to keep track with their detected photon time slot. The system should be set up such that at most one entangled photon pair can be created during each period of the reference pulse. Therefore, if Alice and Bob have common measurement bases, their photons will have a high likelihood to be detected in identical time slots. To not be mistaken with the quantum states, this time slot information does not contain any information of the mode bases; therefore, it can be publicly revealed (see FIG. 7).

The entangled photon generation process, as used in connection with the present invention, does not require or limit to any specific method of generating entangled photons. In practicing the present invention, any entanglement property can be utilized, such as given time, frequency, polarization, etc.

Moving now to summarize the present invention, it exploits quantum entanglement of photons to thereby share common information without any exchange of information regarding the photons' states. Via the superposition of the photon state, it becomes possible to exploit the true randomness and uniqueness of the chosen property to be measured (e.g., photon arrival time, photon temporal mode, photon spatial mode, etc.). Through quantum frequency conversion, for instance, the methods practiced in accordance with the present invention can use the private information as the measurement basis, and therefore, determine the outcome of the quantum state. Entangled photons collapse into the same states on each communication end. However, when they are measured, only the choice of identical measurement bases will return the same results. If the private information does not match (i.e., the measurement bases are different), detected photons return different results.

This disclosure is independent of the measurement bases encryption method. Regardless of how the information is encrypted given temporal modes, spatial modes, etc., the concept that is central to the present invention involves using secret information as the measurement bases of entangled photons.

A novel, privacy-preserving computational method that leaks zero individual data is presented in an embodiment of the present invention, which is based on quantum entanglement, quantum measurement, and in some embodiments, quantum frequency conversion. By deploying unique properties of quantum mechanics, the methods of the present invention constitute a fundamentally new method to secure privacy, distinct from traditional approaches. In other words, the present invention involves a fundamentally new approach to address the challenge of private data sharing and data mining, which are becoming increasingly critical as the data industry expands.

In practice, the present invention provides a methodology immune against attacks on encryption protocol because the private information never leaves the local host to the network, either directly, or under encryption cover. Moreover, this methodology provides high efficiency because there is no complex encryption and decryption computation.

The present invention presents a system and method to perform unconditionally secured private communication, without the need to establish the integrity of any participant, or use an honest third party. Three main essences make the protocol established by the present invention unconditionally secure: First, private data stays with local hosts (i.e., they are never transmitted through communication channels, either public or private, during the computation process). Second, entangled photons continuously provide entangled states with truly random measurement outcomes at each local host for correlation verification. Third, the computation process occurs in a public channel (i.e., no private channel or keys are needed).

Specifically, the private information to be computed or processed jointly between the parties is translated to measurement bases chosen locally by each party according to publicly announced and agreed upon rules. The measurement bases are mutually unbiased, so that at each party, the quantum states are projected onto a particular set of mutually unbiased states. Only when the parties choose the same set can the measurement outcomes be correlated. Entangled photons are sent to each party in a sequence of optical pulses during the computation. Each party then measures the state of each photon using his or her measurement bases. Publicly, each party announces indices of the pulses where photons are detected. By comparing the correlation of each party's indices, computation is completed, without revealing the secret private information.

With the methods practiced in accordance with the present invention, it becomes possible to perform computations based on the information of multiple parties in a pool of data without revealing the actual information of each party, and without any trusted third party. The present invention therefore constitutes a solution to the zero-knowledge proof problem, which is used in authentication and verification, while also enabling secure multiparty computation, which is used in data mining and blockchain. The present invention also obviates the need for any homomorphic encryption step, which is usually the process employed to protect data-in-use, while still maintaining the absolute security of the data-in-use.

It is an object of the present invention to provide a privacy-preserving verification method for comparing one or more data values, numerical or otherwise, for equality (e.g., A=B).

It is another object of the present invention to provide a privacy-preserving verification method for comparing one or more numerical values to confirm or establish one or more inequalities (e.g., A>B).

It is yet another object of the present invention to allow for computation via communication of indices, thereby averting the revelation of secret and/or private information.

It is a further object of the present invention to provide true private-preserving communications without the need for multiple majority honest communication parties, any kind of honest communication party, or any extra party.

It is still a further object of the present invention to provide a system and method that guarantees the probability of fooling from any party is zero. As a result, establishing participants as honest parties is not a pre-requisite for collaboration in computing and/or verifying information. In this protocol, even if some party is cheating, they cannot convince other parties that they are being honest with the outcomes that they send to the public channel.

Another, but not necessarily final, object of the present invention is to provide true privacy-preserving computations to compare data of more than two parties by, for example, expanding the linearity of the emitted signals, thereby enabling unconditionally secured, private multi-party communication wherein zero knowledge is revealed to any party in the computation pool, or outside the computational pool.

BRIEF DESCRIPTION OF FIGURES

For a more complete understanding of the present disclosure, reference is made to the following drawings, in which.

DETAILED DESCRIPTION OF EXEMPLARY EMBODIMENTS

Figure 1:
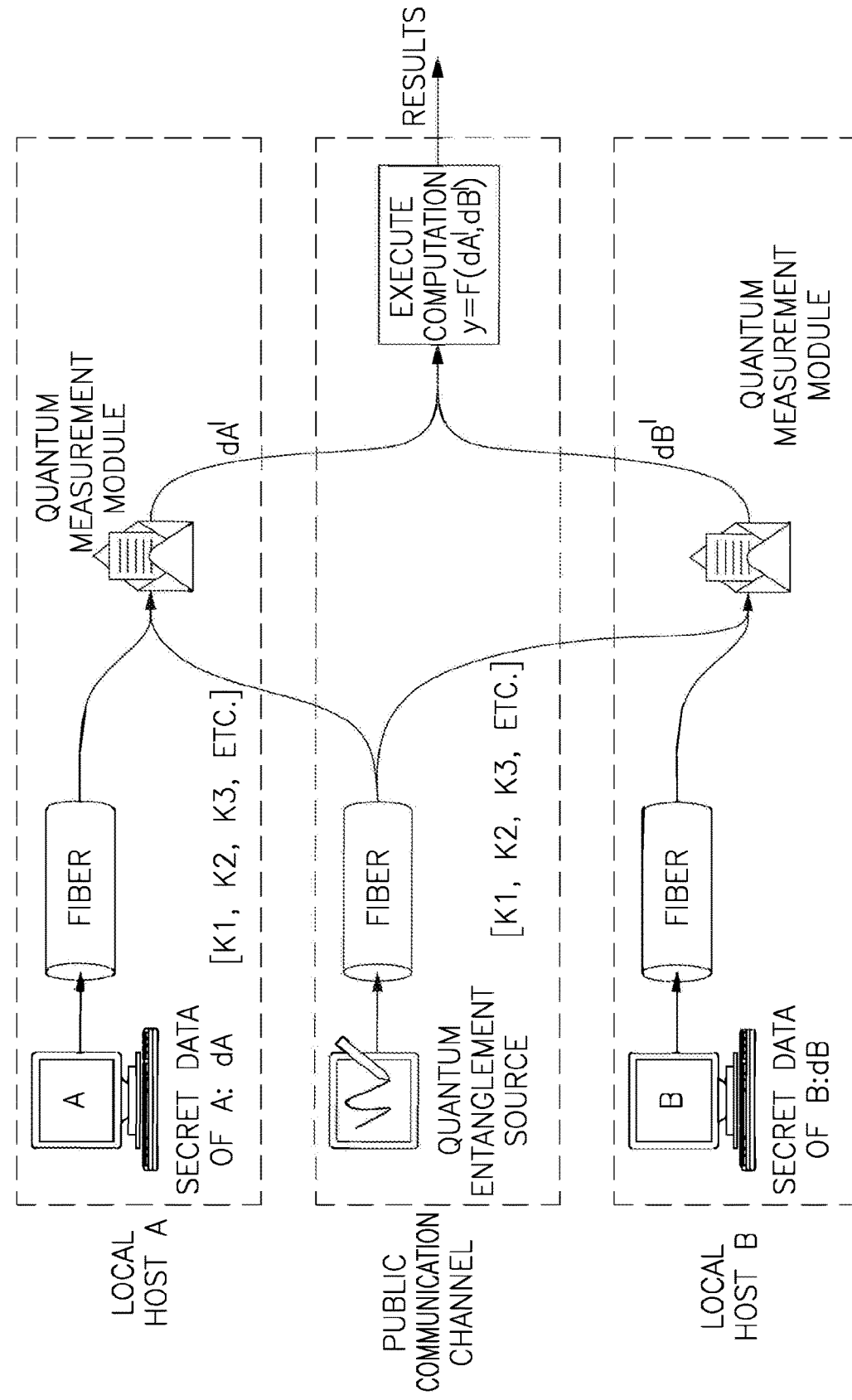
FIG. 1 is a flow chart of an exemplary system in accordance with an embodiment of the present invention.

The methods of the present invention exploit properties of quantum mechanics to provide unconditional security to private information. As an operating principle, the information itself is converted into the measurement bases for the entangled photons by which the encryption takes place. Referring now to FIG. 1, an exemplary process is outlined. The data of interest remains with each of the parties in the pool and are never transmitted through communication channels, whether they be private or public, during the computation process. Instead, entangled photons received by each of the parties in the pool provide continuous, truly random entangled states that allow for verification through correlation of the entangled states. Meanwhile, the computational implementation can occur in a completely public channel, without requiring access to the unencrypted, secret data. Therefore, no private channels or encryption keys are necessary.

For the purpose of simplicity, the following discussion will assume that the computation pool for the absolute secure computations consists of only two parties; however, it should be understood that the methods of the present invention may be applied to mutual computations of more than two parties as well. This can be achieved by using higher orders of nonlinearity, for example, by creating three entangled photons for three parties, creating four entangled photons for four parties, and so on.

Figure 2:
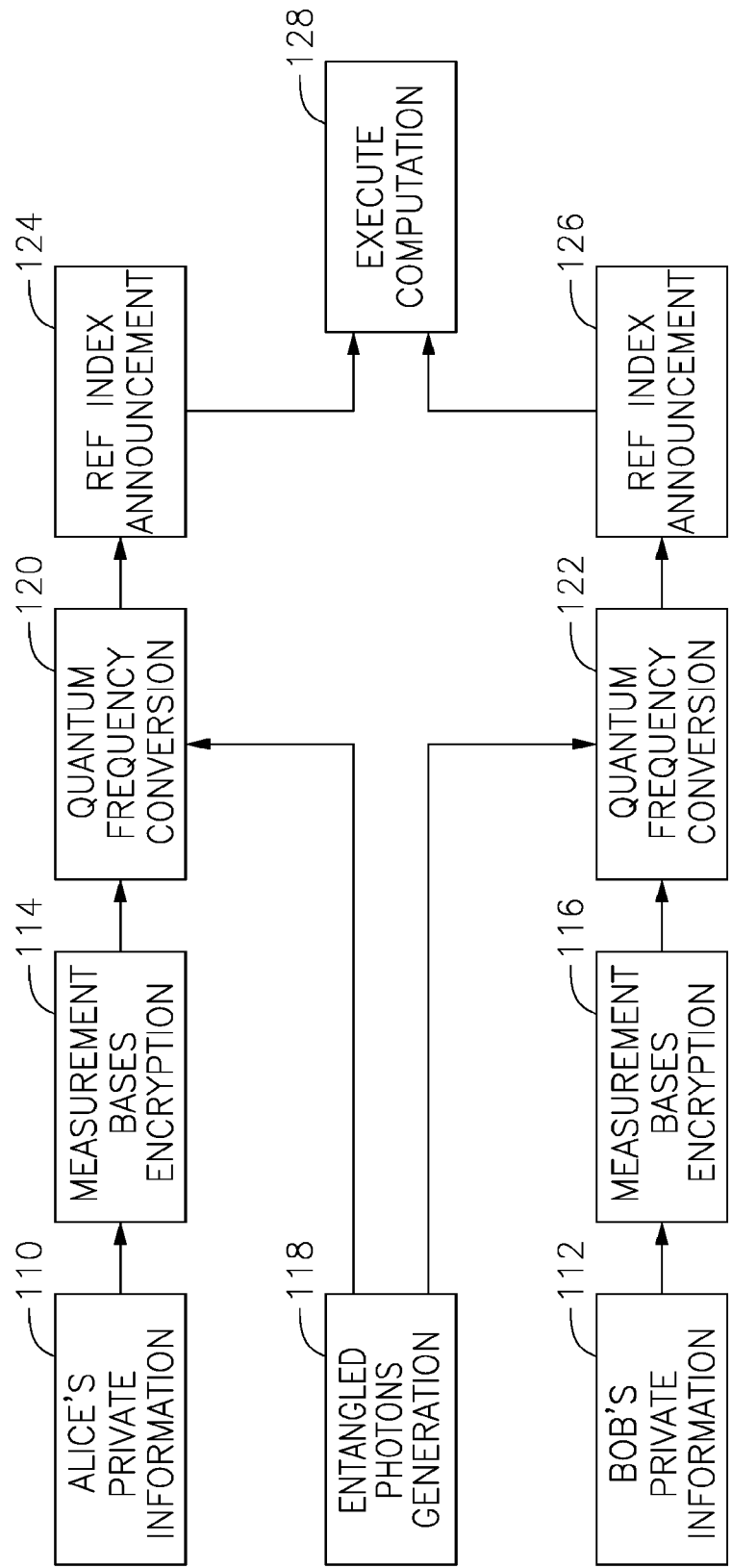
FIG. 2 is a flow chart of an exemplary method in accordance with an embodiment of the present invention.

FIG. 2 is a flow-chart overview of a generalized method in accordance with the present invention. Each set of private information 110, 112 undergoes a corresponding encryption (i.e., conversion) step 114, 116, respectively. Entangled photon generation 118 then occurs. The present invention does not require or limit any particular method of generating entangled photons. Any entanglement property can be utilized, such as given time, frequency, polarization, etc. The generated photons then undergo quantum measurement modules 120, 122, respectively (e.g., quantum frequency conversion) and are measured in accordance with the encrypted bases 114, 116, respectively. Announcement of indices 124, 126 then occurs, based on the application of modules 120, 122, and finally, public computation 128 of the indices 124, 126 occurs.

In one embodiment of the present invention, it is desirable to compare data values for the purpose of determining if such values are equal (i.e., A=B). As a concrete example, suppose two people (i.e., Alice and Bob) wish to determine if they have the same birthday. However, privacy is desired to the extent that neither party wishes to disclose his or her birthday to the other, or anybody else, while performing the comparison, unless they have the same birthday. A further condition is that if their birthdays match, no one else but Alice and Bob should be able to glean their birthdays from what is communicated between the two parties by conventional communication means and/or shared computing resources.

As an initial step of an exemplary process of the present invention, the private information can be converted into measurement bases. This can be achieved by considering each bit of information as a basis in the set. In an embodiment, the type of basis used is photon arrival time; although, it should be noted that any measurement bases can be chosen, so long as quantum entanglement can be established on those bases. For instance, the spectral modes of the entangled photons can constitute an alternative measurement basis.

In order to prevent either party from cheating or trying to guess the measurement basis the other party uses, the measurement bases will be mutually unbiased. In other words, the measurement shall be performed under certain sets of mutually unbiased bases, as chosen by each party according to publicly announced and agreed upon rules.

Figure 3:
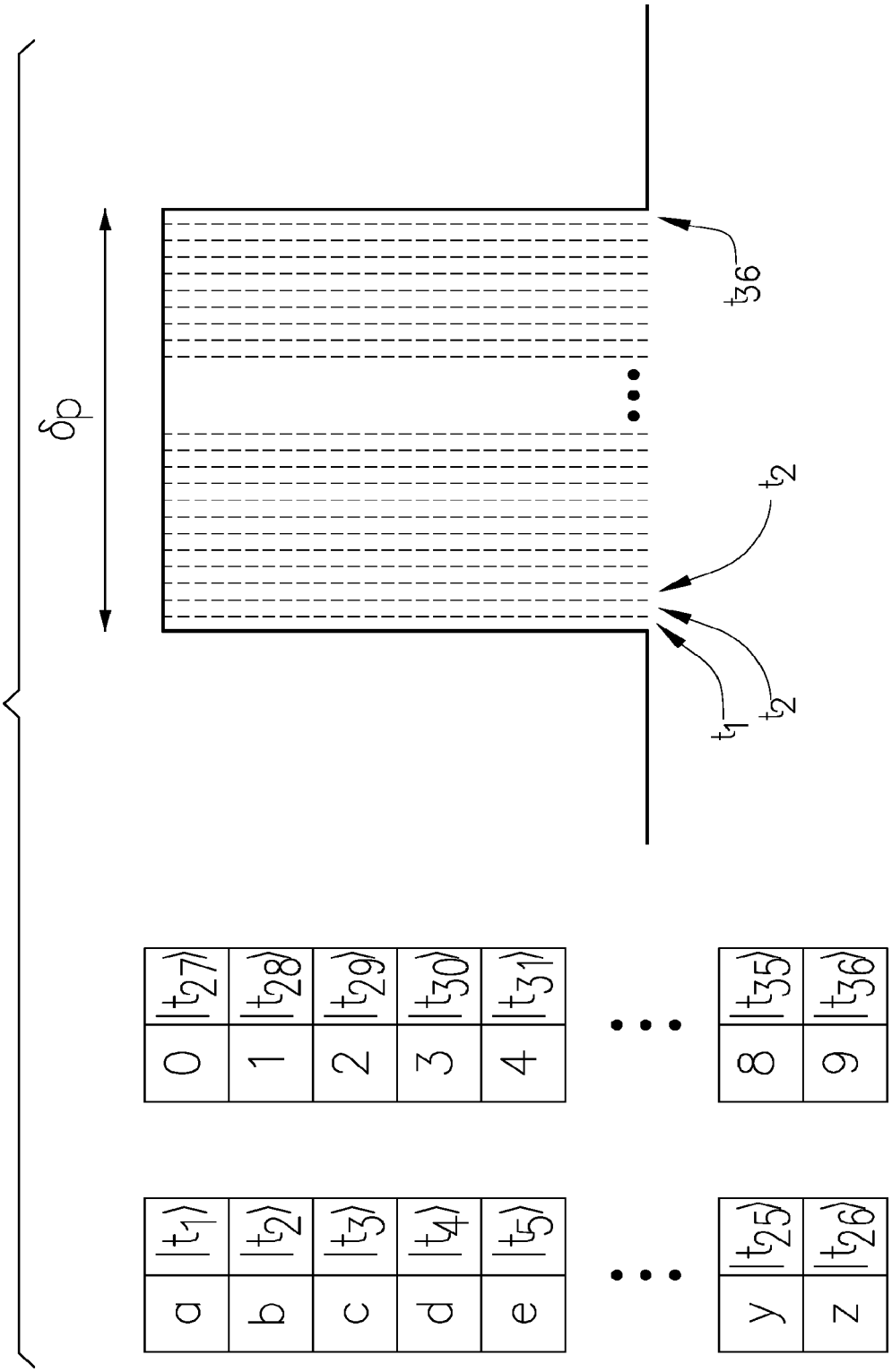
FIG. 3 is a chart and table illustrative of base conversion for an exemplary photon arrival time basis.
Figure 4:
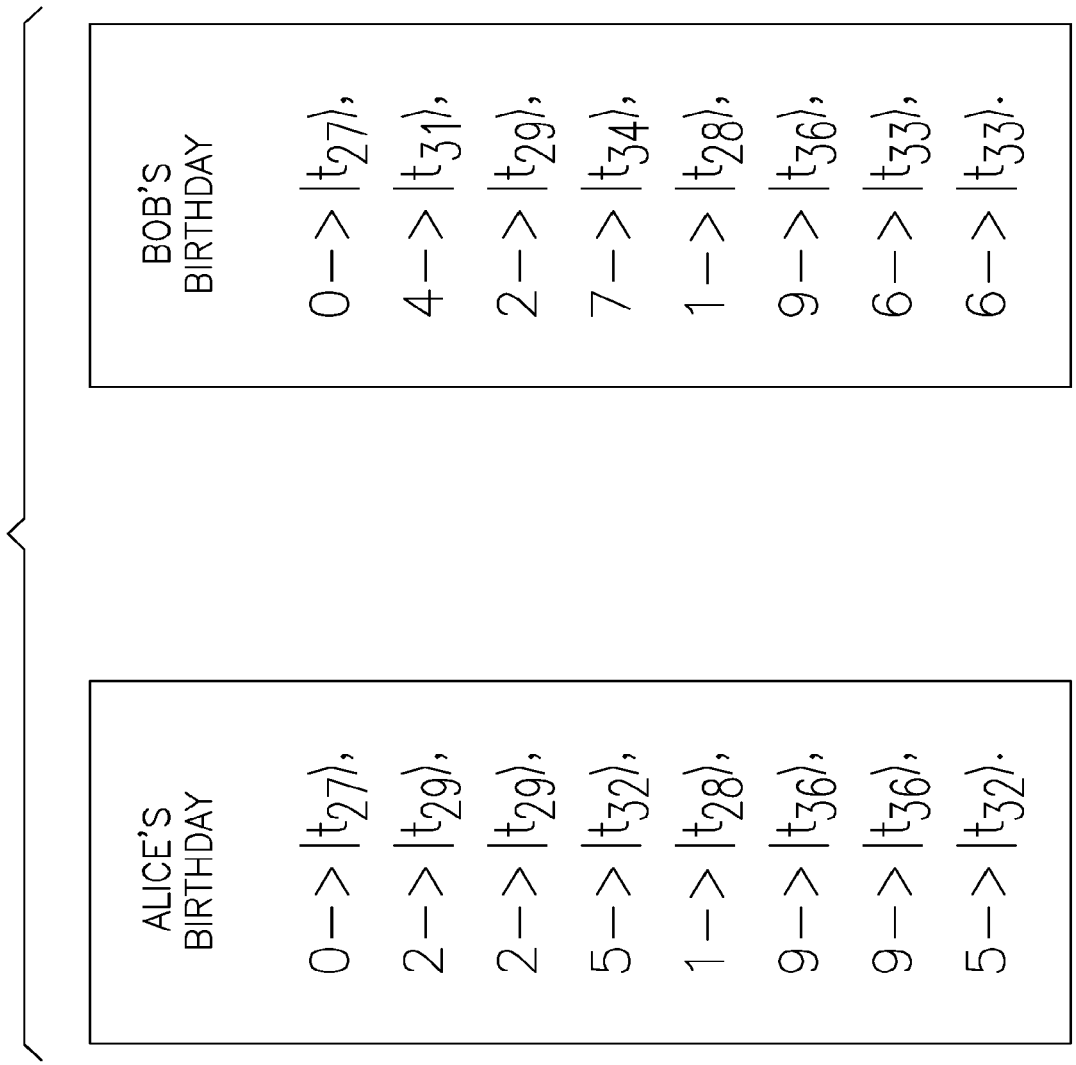
FIG. 4 is a pair of tables demonstrating encryption using the arrival time basis of FIG. 3.

FIG. 3 is an example of a photon arrival time basis set. In this example, Alice's birthday is Feb. 25, 1995, while Bob's birthday is Apr. 27, 1966. FIG. 4 shows how their information is encrypted into measurement bases. This process is done locally by each party.

The measurement bases are applied to a first pulse train of entangled photons (i.e., signal ("A")) and a second pulse train of entangled photons (i.e., idler ("B")) prepared by Alice, Bob, or any third party. Signal "A" is sent to Alice, while idler "B" is sent to Bob. The entangled state can be described as:

$$|\Psi\rangle = \frac{1}{\sqrt{d}} \sum_{j=0}^{d} |t_j^s\rangle |t_j^i\rangle$$

where $|t_j^s\rangle$, $|t_j^i\rangle$ are the superpositions of states that signal and idler photons can collapse into, and d is the number of dimensions in Hilbert space of the photons. In practice, the actual quantum states will deviate from the above ideal form, but will nonetheless allow for computing and operation. For example, in time bin entanglement, d is the number of time bins (i.e., the number of possible timespans in which the photon may arrive). In this specific example, photon arrival time basis set has d=36. In other words, the Hilbert space of the quantum superposition of the states is represented by thirty-six (36) bases, corresponding to the thirty-six (36) respective distinct time bins (i.e., $t_1, t_2, t_3 \ldots t_{36}$). As shown in FIGS. 3 and 4, each bit of data is converted to a corresponding time bin dependent on its value. Accordingly, each birthday is translated from eight digits (two for the day, two for the month and four for the year) into eight corresponding quantum states (i.e., time bins).

When Alice and Bob receive the entangled photons, each of them then measures with the measurement bases that they have prepared locally. For Alice and Bob to detect photons from the same pair, they should use common measurement bases to project onto the entangled state. It should be emphasized that the secret information itself is transformed into the measurement bases that are projected onto the entangled state.

$$\langle t_j^s t_k^i | \Psi \rangle = \delta_{j,k} \text{ where } \begin{cases} \delta_{j,k} = 1, & \text{if } j = k \\ \delta_{j,k} = 0, & \text{otherwise} \end{cases}$$

In one embodiment, the quantum measurement module is a sum frequency generation (SFG) process. Signal photon "A" has frequency ω1 while idler photon "B" has frequency ω1'. Each interacts with its respective measurement bases photons of ω2 and ω2' to produce σ and ω' where

ω=ω1+ω2

ω'=ω1'+ω2'

Figure 5:
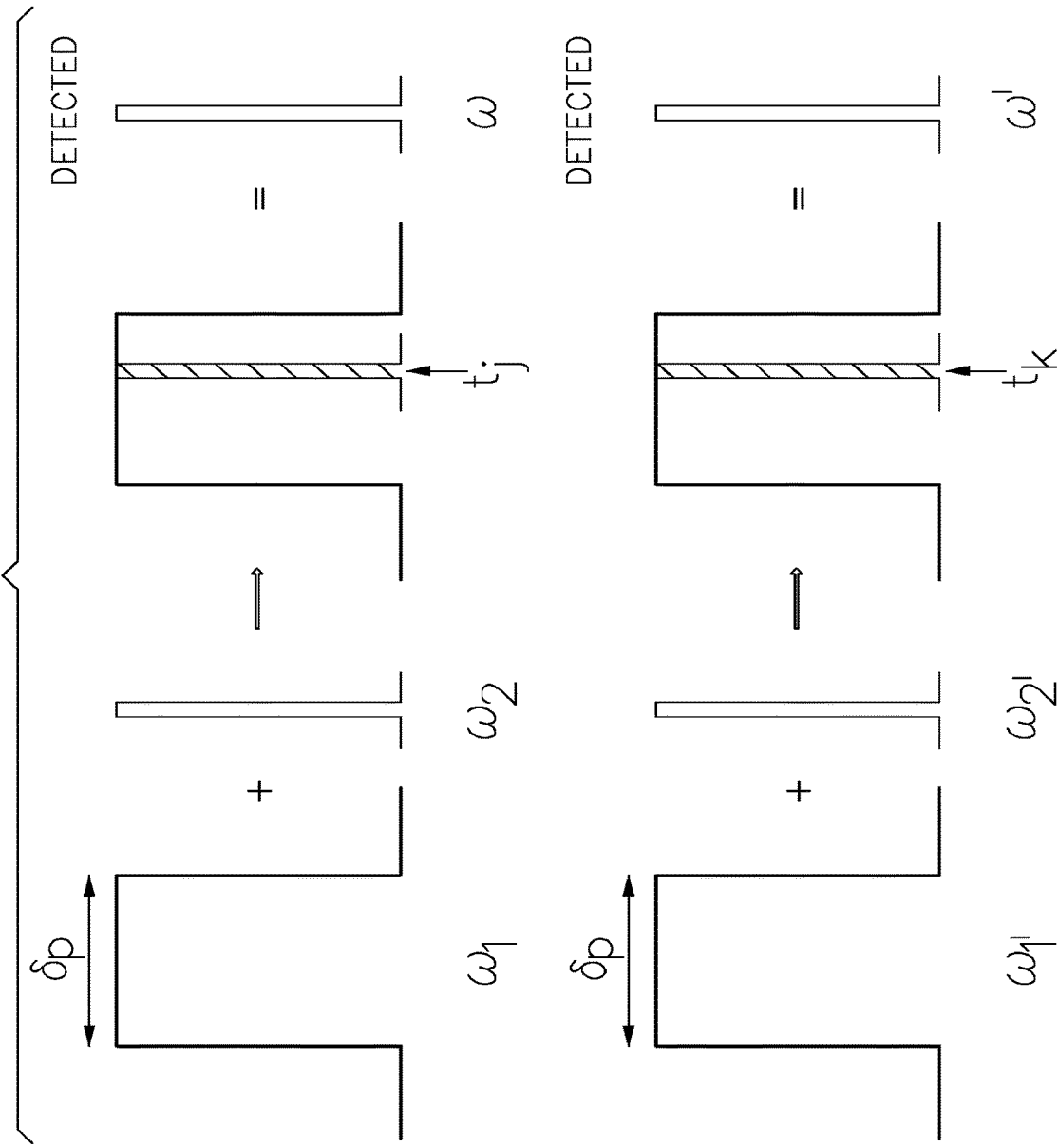
FIG. 5 is a schematic chart illustrating a case in which common time bins are chosen as the bases by two parties.
Figure 6:
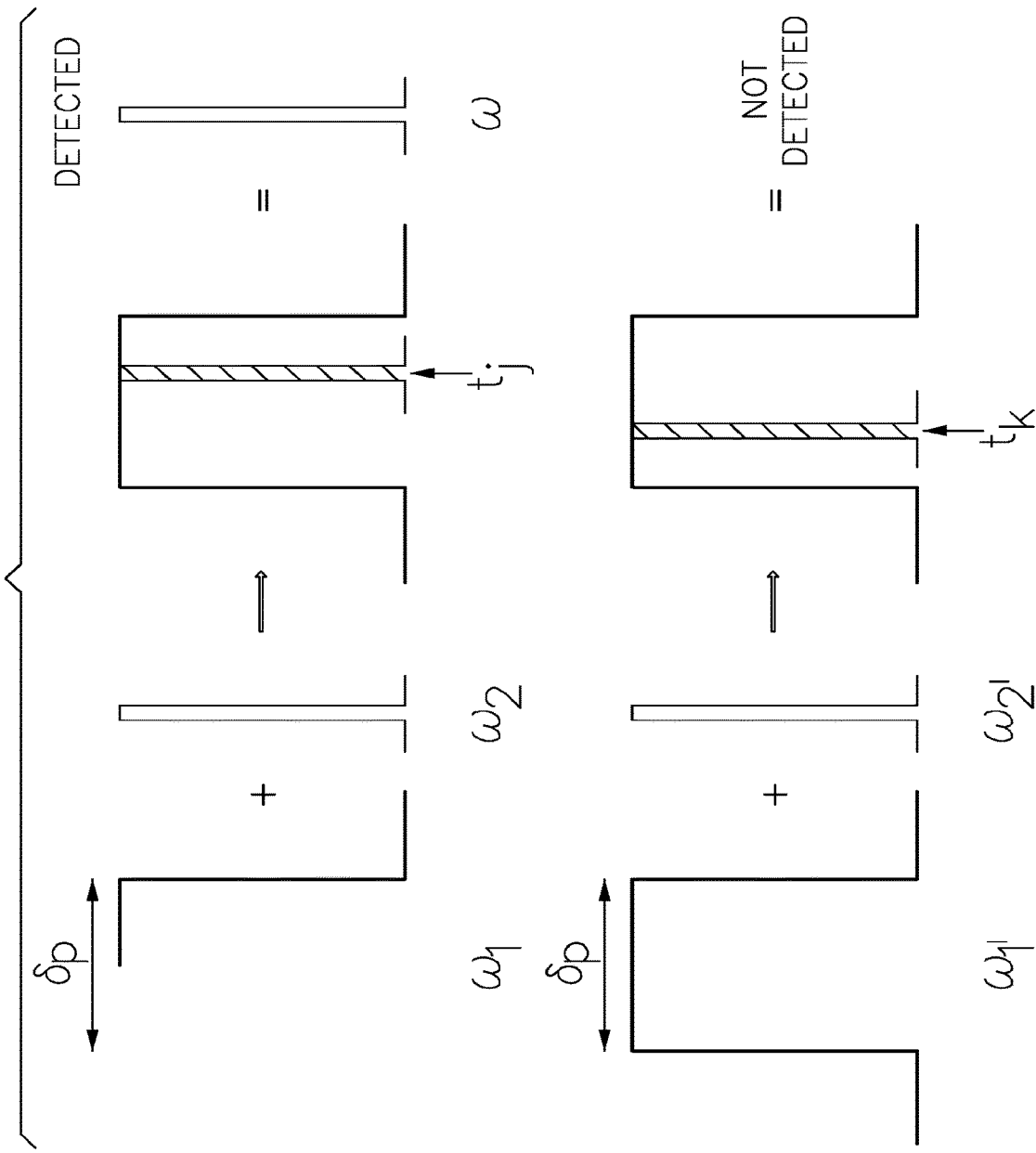
FIG. 6 is a schematic chart illustrating a case in which different time bins are chosen as the bases by two parties.

If Alice and Bob have the same private information (i.e., A=B), they should have the same choice of measurement bases, which means they choose to convert the same time bins during the SFG. FIG. 5 demonstrates this case where j=k. In this scenario in which they convert the same time bin, it is expected that the measurements made will observe the same detection or non-detection of a photon following the collapse of the arrival time superposition. Otherwise, as FIG. 6 illustrates, if detection occurs for Alice but not Bob or vice versa, it means they have different measurement bases choice (j≠k).

Figure 9:
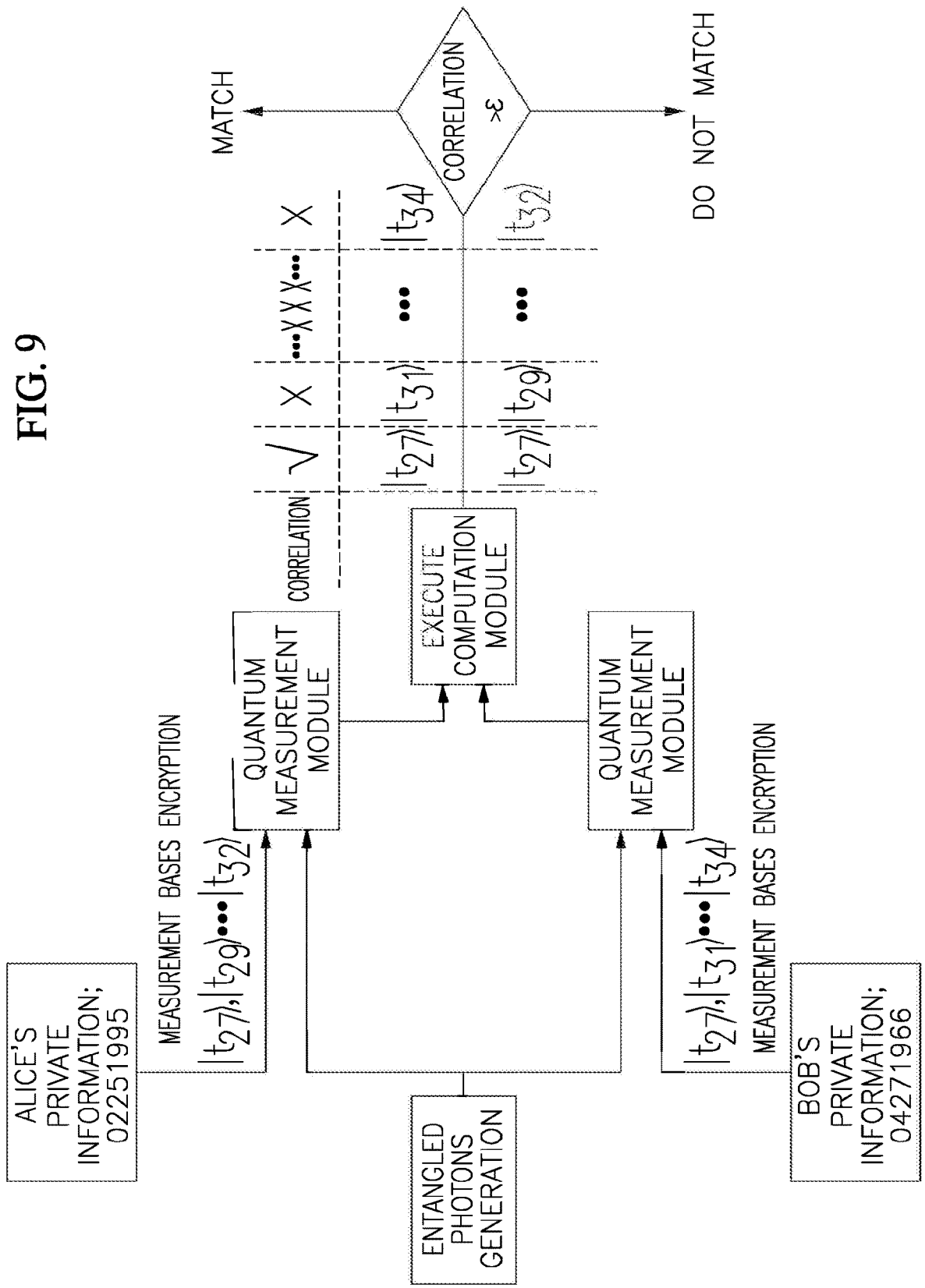
FIG. 9 is a system diagram illustrating an exemplary case in which the private information of two parties is different.

FIG. 9 provides a system-level diagram of the computation process in which some of the chosen measurement bases differ between the parties (i.e., the secret information is not the same). In one embodiment, the measurement bases photon or the pump photon has very narrow temporal width compared to the entangled photon pulse width.

Figure 7:
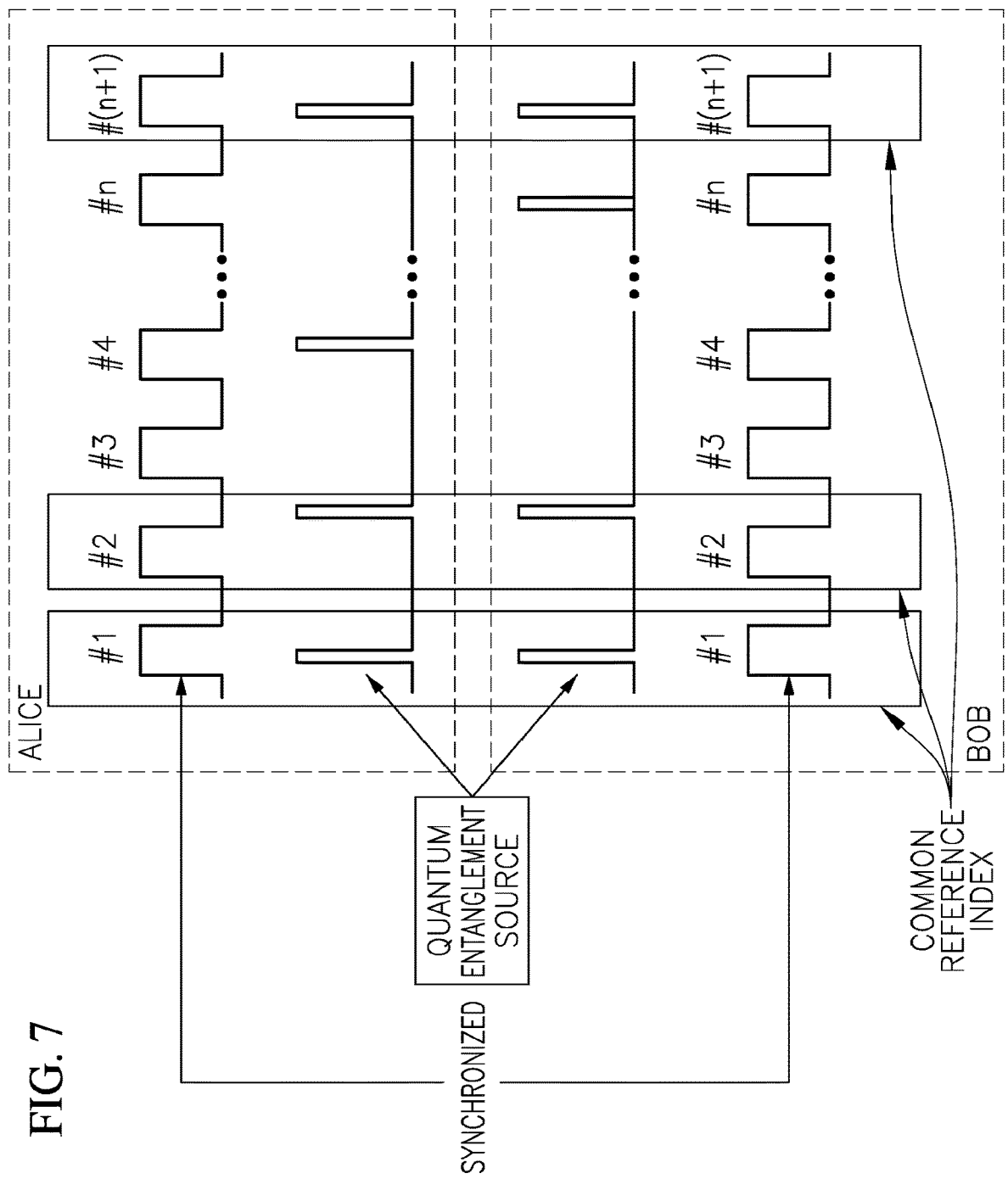
FIG. 7 is a schematic chart illustrating a process of index selection in accordance with an embodiment of the present invention.

Following the application of measurement bases, Alice and Bob continuously and simultaneously announce to the public channel the index of pulse in the pulse train when a photon is detected on their ends. For example, in FIG. 7, Alice announces REF #1, #2, #4, . . . , #(n+1), while Bob announces REF #1, #2, . . . , #n, #(n+1).

The pulse index represents the time slot number of a detected photon. All parties in the communication pool are synchronized to a common reference signal to keep track of their detected photon time slot. The system should be set up such that at most one entangled photon pair can be created during each period of the reference pulse. Therefore, if Alice and Bob have common measurement bases, their photons will have a high likelihood to be detected in identical time slots. Contrary to the quantum states, this time slot information does not contain any information of the mode bases; therefore, it can be publicly revealed with little consequence.

Once the reference indices are publicly announced, the computational step can be initiated. An exemplary process compares if the amount of common reference indices is larger than a certain threshold. The threshold is determined by the level of confidence and system noise level. In one embodiment, the probability of common reference, P(A∩B) is defined as the number of common reference indices over the total number of the pulses under test. A sample criterion can be set as P_threshold=100*P(A)*P(B), with P(A) and P(B) being probability of photon detection rate for Alice and Bob, respectively, calculated as their respective number of total pulses with detection over the total pulses under test. In this example, the threshold is set at one hundred times the predicted theoretical probability of both Alice and Bob detecting a photon at a particular index as calculated from the experimental probabilities P(A) and P(B). If the experimental probability of both Alice and Bob detecting a photon at a particular index, P(A∩B)≥P_threshold, then the two measurements are said to be correlated, which indicates that the same measurement bases have been used by Alice and Bob, and therefore, they have the same birthday. Alice and Bob accomplish the comparison without birthday information ever leaving either individual. Otherwise, the two measurement bases are not the same, or there is no conclusive judgement whether they are the same or not.

Figure 8:
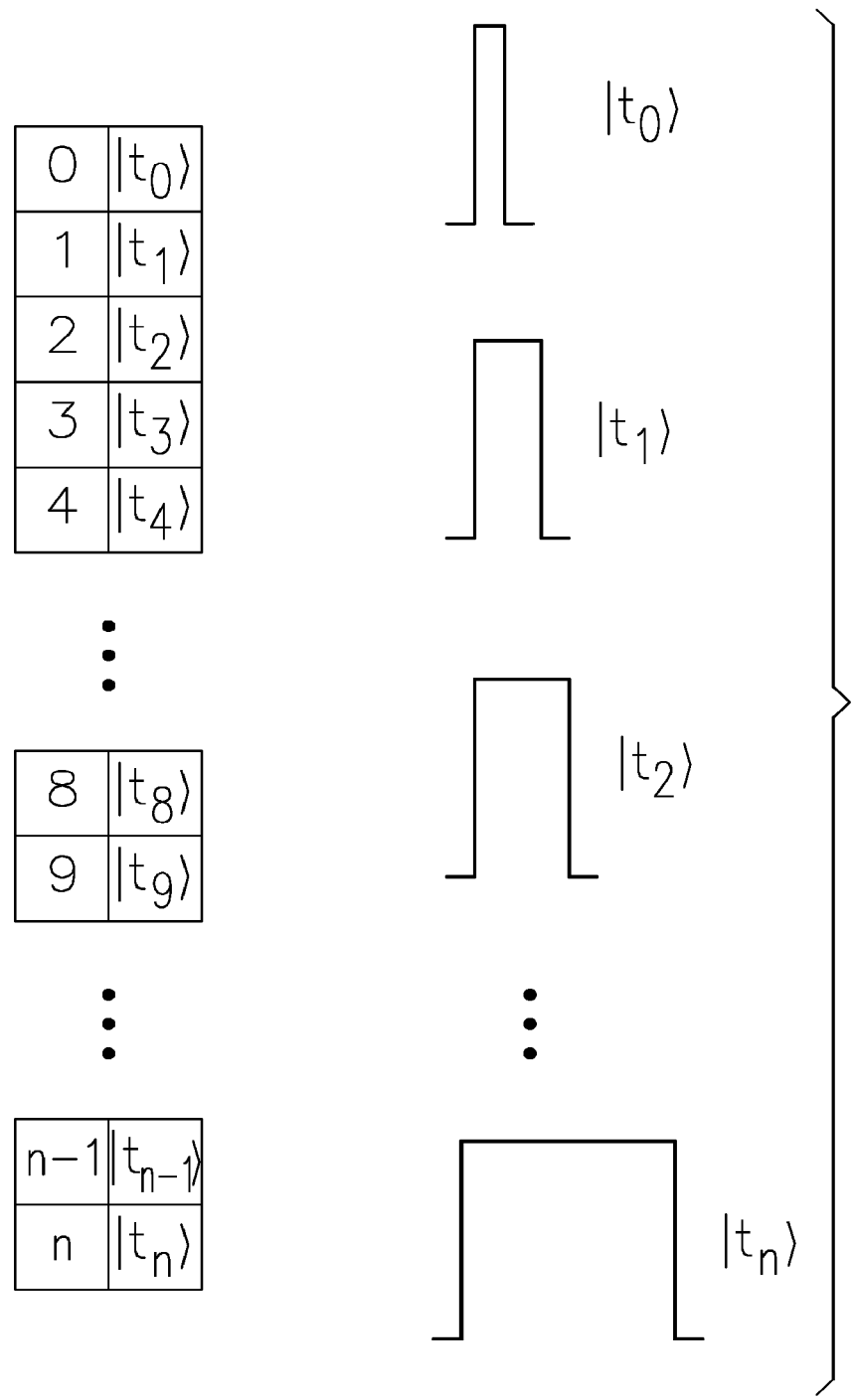
FIG. 8 is an alternate schematic chart and table illustrative of base conversion for an exemplary photon arrival time basis.
Figure 10:
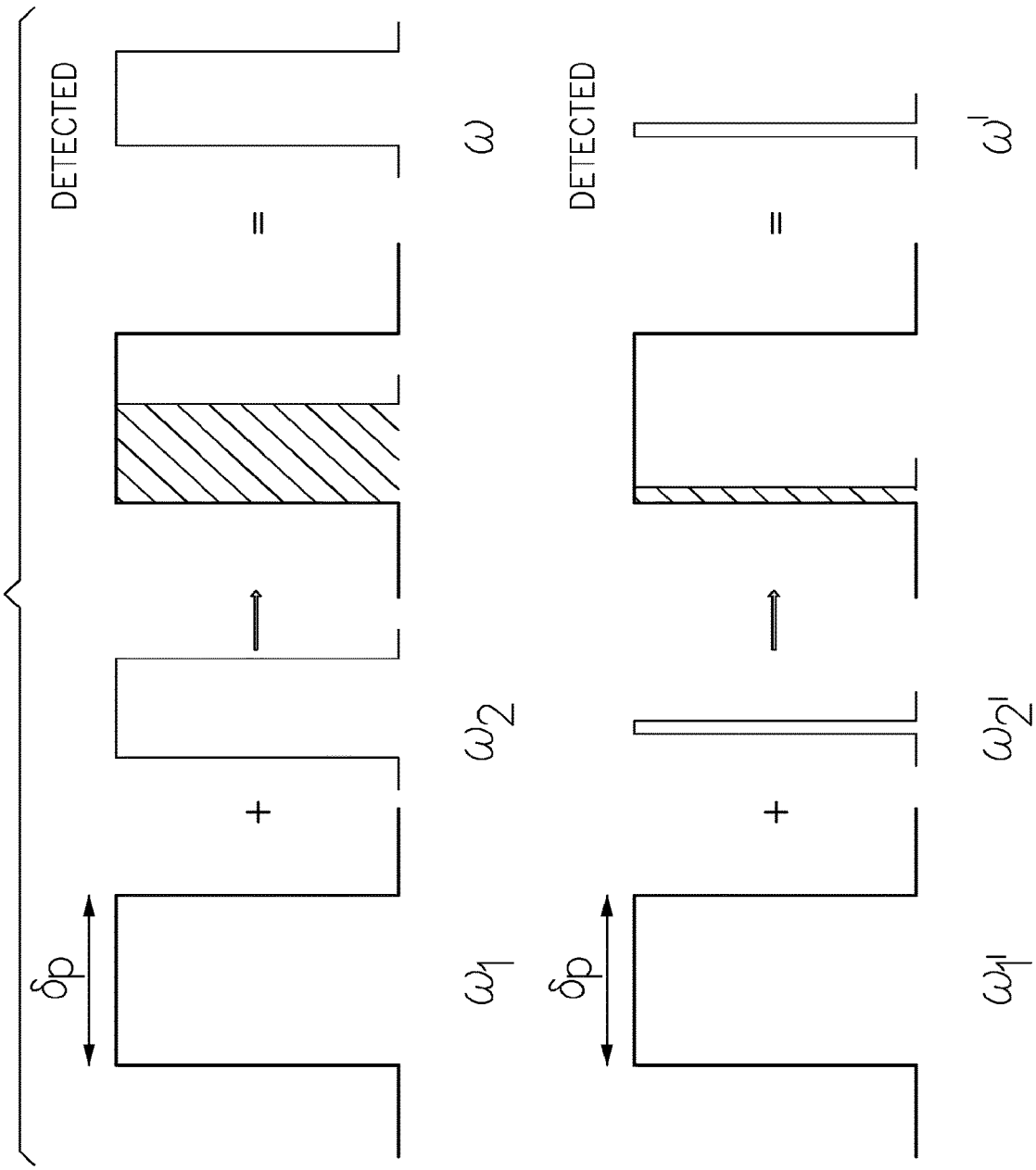
FIG. 10 is a schematic chart illustrating a case in which private information is compared and one party's information has a larger value than the second party's information.

For the scenario of determining inequalities (e.g., A>B or A<B), as opposed to a comparison for equality (A=B), the protocol is based on the following postulate: there is either no loss, or equal loss when transferring entangled photons from the source to each party. The procedure is analogous to the scenario of verifying if A=B prior to the performance of the computational step described in the preceding paragraph. Nonetheless, a suitable measurement bases encryption process still needs to be provided. FIG. 8 is an example of how the secret information may be encrypted to be used as measurement bases for the case of inequalities. In this example, if Alice and Bob want to compare their ages, where Alice is 21 years old and Bob is 15 years old. Alice's age is higher, and therefore, it is encrypted as larger pulse width compared to Bob's. The translation of the measurement bases to pulse widths is illustrated in FIG. 10.

Upon reaching the aforementioned computational step, the reference indices are collected to perform conditional probability as follows:

$$P(A|B)=(P(A\cap B))/(P(B)) \text{ and } P(B|A)=(P(A\cap B))/(P(A))$$

where P(A|B) is the probability of detecting a photon on Alice's detection setup, given that a photon had already been detected on Bob's side, and P(B|A) is the probability of detecting a photon on Bob's detection setup, given that a photon had already been detected on Alice's side, with P(B) being the probability of detecting a photon on Bob's detection setup and P(A) being the probability of detecting a photon on Alice's detection setup, and where P(A∩B) is the probability of detecting a photon on Alice's side and Bob's side, these latter three probabilities calculated as previously described hereinabove.

Because Alice's measurement bases correspond to larger pulse widths for the purpose of this example, P(A|B)>P(B|A). Therefore, on the public channel, from the reference indices announced by Alice and Bob, it can be determined that A>B.

The method and system described herein can perform unconditionally secured private computation between parties, as the private information to be computed is translated to measurement bases locally by each party. With entangled photons being sent to each party in a sequence of optical pulses during the computation, each party can independently measure the state of each photon using his or her measurement bases. Each party can then announce indices of the pulse where a target state is detected. By comparing the correlation of each party's indices, the computational process is completed, without ever revealing the secret/private information. This makes the methods of the present invention immune against attacks on encryption protocol because the private information never leaves the local host to the network, either directly, or under encryption cover.

Additionally, the system and method of the present invention accomplish true private-preserving computations without ever requiring multiple honest communication parties, any kind of honest communication party, or any extra party at all. The present invention also minimizes the probability of fooling from any party to near zero. The system and method can be further extended to provide private-preserving computations for multiple communication parties where absolute zero knowledge is either revealed to any party in the computation pool or anyone else outside the computation pool.

In this protocol, no private information is revealed under any kind of encrypted data in the public channel. Therefore, meaningful attacks to the protocol can only come from dishonest parties within the communication pool. We describe attack models below and specify design requirements to secure the system unconditionally.

Attack 1: At Bob's local host, instead of preparing the quantum MUBs corresponding to his private information, he uses a beamsplitter (BS) to split the light into k branches, and then uses k numbers of single photon detector to measure all given k MUBs simultaneously. Hence, if there is N number of photons expected to be detected in the correct MUBs, this attack model allows Bob to detect N/k number of photons per branch. This attack could allow Bob to acquire information on Alice's measurement bases, thus her private information, by computing the correlation of the REF IDs Bob obtains in each channel with those by Alice. To secure the system against this type of attack, the size of MUBs should be large enough such that N/k is less than or comparable to 1, or such that the correlation of the REF IDs by Alice and Bob cannot be reliably derived.

Attack 2: Given k is the size of MUBs, at Bob's local host, instead of preparing the quantum MUBs corresponding to his private information, he uses a beamsplitter to split the coming light into m branches (m<k), and then uses m number of single photon detector(s) to measure m MUBs simultaneously. This gives Bob a chance to beat the noise level of matched REF IDs if the MUBs containing private information happen to be in the set of m MUBs he chose. By constantly swiping through all different sets of m MUBs among the k MUBs during measurement, Bob has a chance to collect part of the private information. To secure against this attack, private information can be encrypted to quantum measurement bases using the secret sharing encryption methods. This scheme distributes private information into n pieces such that if Bob collects fewer than n pieces, he has no more information about the private information than as if he collects zero pieces. Only a collection of all n pieces can recover the private information. Examples of the secret sharing encryption methods can be found here: https://en.wikipedia.org/wiki/Secret_sharing.

Attack 3: Bob pretends to share the same information with Alice, or holds the information Alice is looking for, by creating a fake list of REF IDs to pass the correlation test. To secure against this attack, Alice and Bob will distribute their respective private information into n pieces, either directly or by using secret sharing encryption, the latter adopted to ensure zero information exposure. Then, they will perform private computing on each of the n information pieces sequentially, with Alice and Bob taking turns to first announce the REF IDs for each. For example, for the $1^{st}$ piece, Alice will announce the REF IDs first, followed by Bob. For the $2^{nd}$ piece, Bob will announce the REF ID first, followed by Alice. Each party will choose to terminate the communications with each other at any point when the correlation test fails. In this way, neither party can pretend to have the information by making fake REF ID lists.

For the reasons above, the present invention may assist in a variety of contexts. In data mining, it can enable multiple databases to perform collaborative communication while preserving privacy. In the context of electronic auctions, bidders may be able to keep their bid prices a secret while still allowing auctioneers to recognize the highest bid. Yet another envisioned use is enabling zero-knowledge authentication, wherein one party can prove its identity by showing knowledge of a password, while not revealing it for any other party to see. A fourth, not necessarily final, application can involve blockchain multiple party communication, wherein multiple participants collaborate on a computation over an existing blockchain, without the need for a trusted outside party.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the present invention described herein.

What is claimed is:

1. A method for secure communications between multiple parties, comprising the steps of:
    transforming private information into measurement bases;
    generating a plurality of sets of entangled photons, wherein each photon of said plurality of sets of entangled photons represents a corresponding optical pulse or a quantum mechanical superposition of optical pulses;
    transmitting said plurality of sets of entangled photons, one set of entangled photons at a time, to a plurality of communication parties, wherein each communication party of said plurality of communication parties receives a photon from each set of said plurality of sets of entangled photons in the order in which said plurality sets of entangled photons are transmitted;
    applying said measurement bases to said optical pulses and detecting said photons on said measurement bases to obtain respective data for each party of said plurality of communication parties in the order in which said optical pulses are received by each party; and
    computing a secure communication by comparing said respective data for each party of said plurality of communication parties.

2. The method of claim 1, wherein said applying step is performed independently by each party of said plurality of communication parties.

3. The method of claim 1, further comprising the step of establishing rules for effecting said transforming step.

4. The method of claim 1, further comprising the step of continuously sending a reference signal to each party of said plurality of communication parties, said reference signal having a predetermined period, and wherein one optical pulse is transmitted to each party of said plurality of communication parties for each said predetermined period of said reference signal.

5. The method of claim 1, wherein said computing step is performed publicly, and wherein said private information never leaves said plurality of communication parties.

6. The method of claim 1, wherein said computing step includes determining whether respective private information is the same for each party of said plurality of communication parties and assessing an inequality between respective private information of each party of said plurality of communication parties.

7. The method of claim 1, wherein said measurement bases comprise photon arrival times with discrete time bins, spectral modes, temporal modes, or spectral-temporal modes of said photons.

8. The method of claim 1, wherein said applying step includes subjecting said photons to a quantum measurement module, wherein said quantum measurement module comprises sum frequency generation.

9. The method of claim 1, wherein said private information is a password, authentication codes, data strings, values, or a set of private data needed in a multiparty computation function, and wherein said method further comprises the step of verifying shared knowledge of said private information without communicating said private information.

10. The method of claim 1, wherein said computing step constitutes data processing at zero knowledge.

11. The method of claim 1, wherein said computing step involves data mining.

12. The method of claim 1, wherein said photons of each set of said plurality of sets of entangled photons are received by their respective parties of said plurality of communication parties at the same time or at different times.

13. The method of claim 1, wherein said step of transforming private information into measurement bases includes the step of performing computation of information such that the context of said secure communication is not restricted to numbers, and wherein the step of performing computation of information includes the step of performing at least one of addition, subtraction, multiplication, and division, and wherein parties of said plurality of communication parties process public data using private computation algorithms and transform the results into measurement bases, by which the computation algorithms amongst communication parties are compared.

14. A method for secure communications between multiple parties, comprising the steps of:
    transforming private information into measurement bases;
    generating a plurality of sets of entangled photons, wherein each photon of said plurality of sets of entangled photons represents a corresponding optical pulse or a quantum mechanical superposition of optical pulses;

transmitting said plurality of sets of entangled photons, one set of entangled photons at a time, to a plurality of communication parties, wherein each communication party of said plurality of communication parties receives a photon from each set of said plurality of sets of entangled photons in the order in which said plurality sets of entangled photons are transmitted;

assigning each set of entangled photons an index number based on the order in which said plurality of sets of entangled photons are transmitted to said plurality of communication parties, whereby optical pulses corresponding to photons from the same corresponding set of entangled photons are associated with identical index numbers;

applying said measurement bases to said optical pulses and detecting said photons on said measurement bases to obtain respective data for each party of said plurality of communication parties in the order in which said optical pulses are received by each party; and generating from said respective data corresponding lists of relevant indices for each party of said plurality of communication parties.

15. The method of claim 14, wherein said applying step is performed independently by each party of said plurality of communication parties.

16. The method of claim 14, further comprising the step of establishing rules for effecting said transforming step.

17. The method of claim 14, further comprising the step of continuously sending a reference signal to each party of said plurality of communication parties, said reference signal having a predetermined period, and wherein one optical pulse is transmitted to each party of said plurality of communication parties for each said predetermined period of said reference signal.

18. The method of claim 14, further comprising the step of announcing said corresponding lists of relevant indices.

19. The method of claim 14, wherein said private information never leaves said plurality of communication parties.

20. The method of claim 14, wherein said measurement bases comprise photon arrival times with discrete time bins, spectral modes, temporal modes, or spectral-temporal modes of said photons.

21. The method of claim 14, wherein said applying step includes subjecting said photons to a quantum measurement module, wherein said quantum measurement module comprises sum frequency generation.

22. The method of claim 14, wherein said private information is a password, authentication codes, data strings, values, or a set of private data needed in a multiparty computation function, and wherein said method further comprises the step of verifying shared knowledge of said private information without communicating said private information.

23. The method of claim 14, wherein said photons of each set of said plurality of sets of entangled photons are received by their respective parties of said plurality of communication parties at the same time or at different times.

24. The method of claim 14, wherein said step of transforming private information into measurement bases includes the step of performing computation of information such that the context of said secure communication is not restricted to numbers, and wherein the step of performing computation of information includes the step of performing at least one of addition, subtraction, multiplication, and division, and wherein parties of said plurality of communication parties process public data using private computation algorithms and transform the results into measurement bases, by which the computation algorithms amongst communication parties are compared.

25. The method of claim 14, where said corresponding lists of relevant indices by communication parties are analyzed to identify the statistical relation between the lists of relevant indices, by which the relation between the private information is estimated, wherein said private information corresponds to a private number held by each communication party, and said statistical relation includes the conditional probabilities of the list of relevant indices reported by one communication party on that from another party, and wherein the statistical relation is used to determine the ranking of the number held by each communication party, but the values of said private numbers are not revealed during the process.

* * * * *